May 15, 1962 L. A. HARLANDER ETAL 3,034,825
CONTAINER CHASSIS COMBINATION
Filed July 20, 1959 3 Sheets-Sheet 1
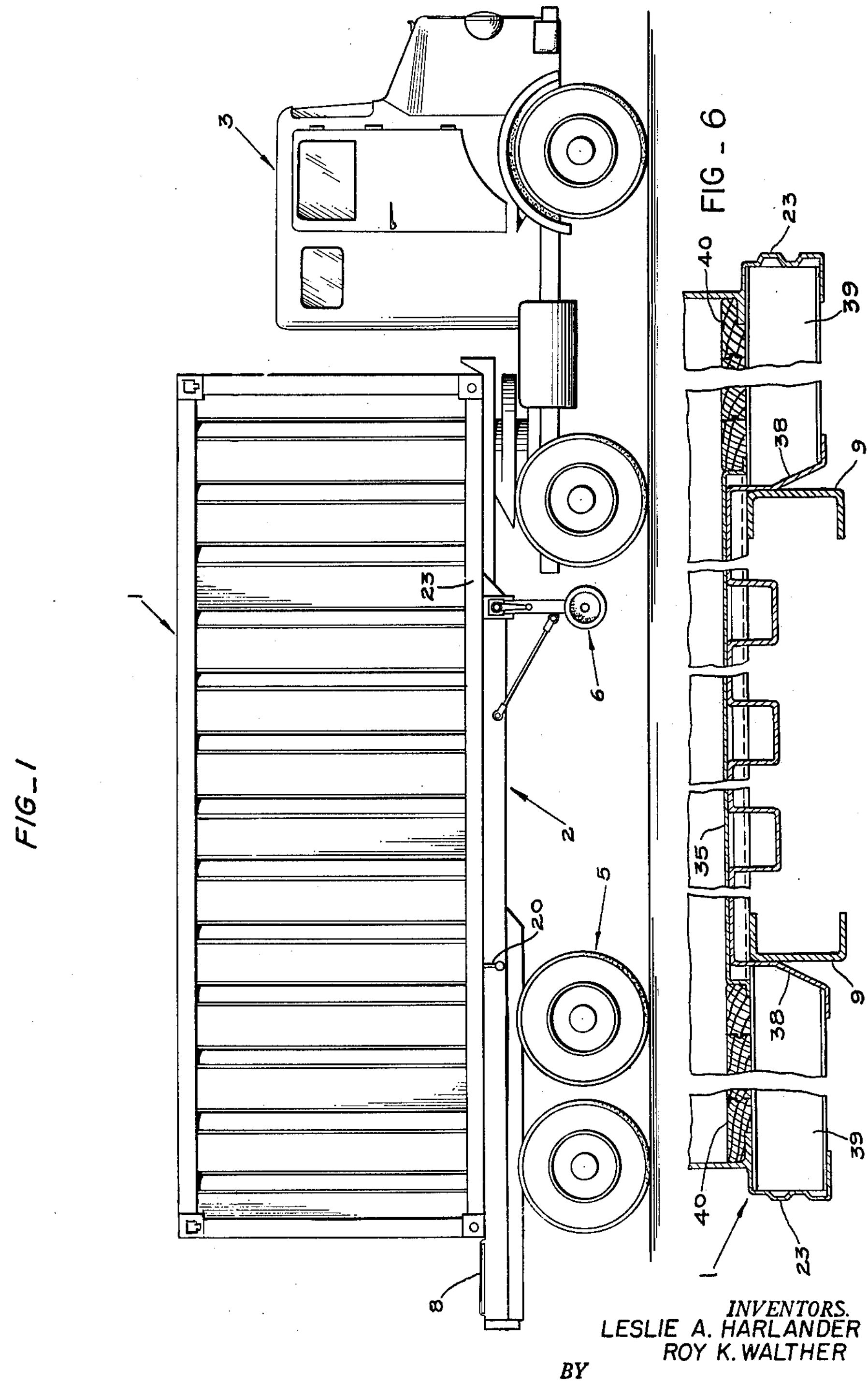
INVENTORS.
LESLIE A. HARLANDER
ROY K. WALTHER
BY
Boyken, Mohler & Wood
ATTORNEYS CONTAINER CHASSIS COMBINATION
Filed July 20, 1959 3 Sheets-Sheet 2
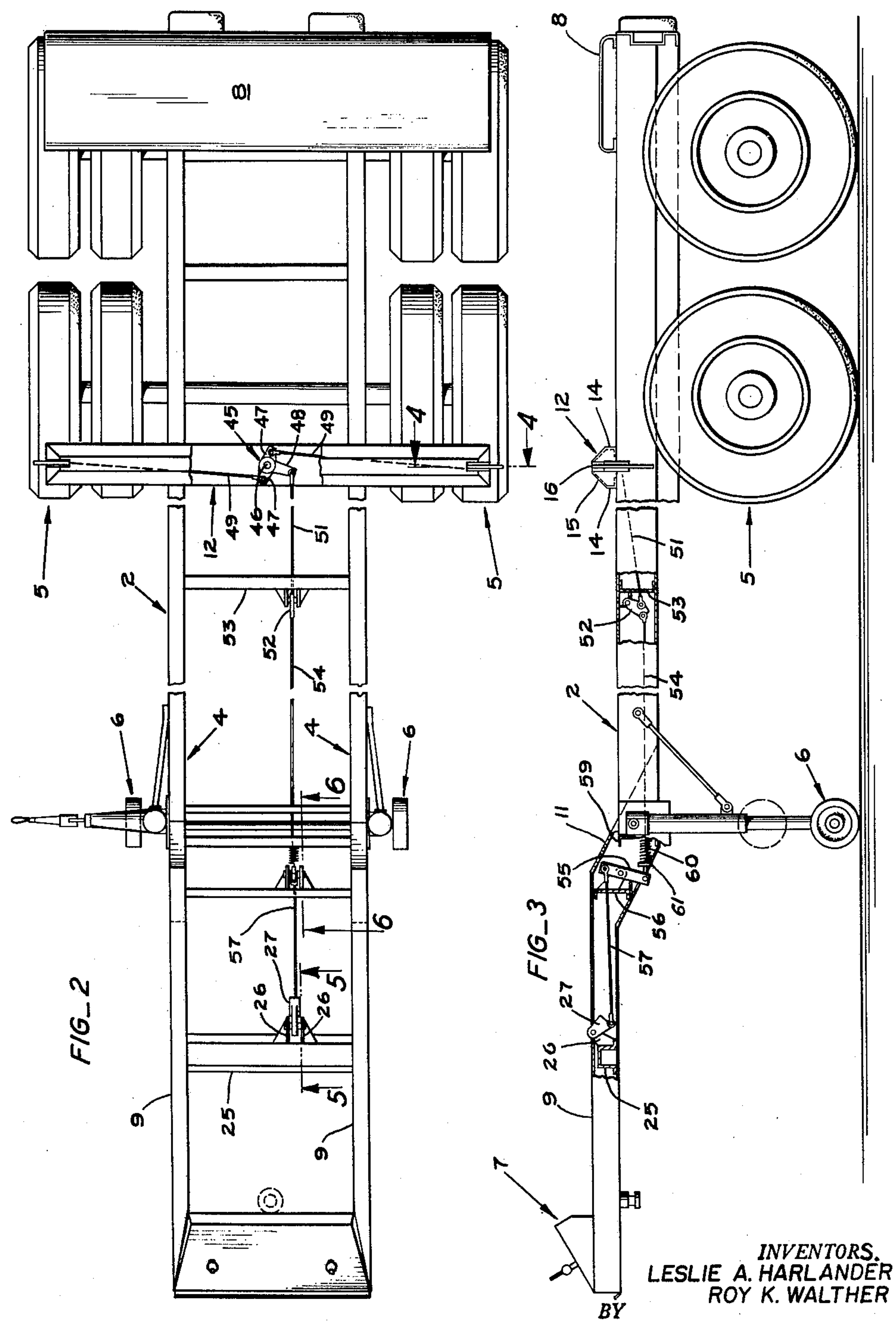
INVENTORS.
LESLIE A. HARLANDER
ROY K. WALTHER
BY
Boyken, Mohler & Wood
ATTORNEYS May 15, 1962 L. A. HARLANDER ETAL 3,034,825
CONTAINER CHASSIS COMBINATION
Filed July 20, 1959 3 Sheets-Sheet 3
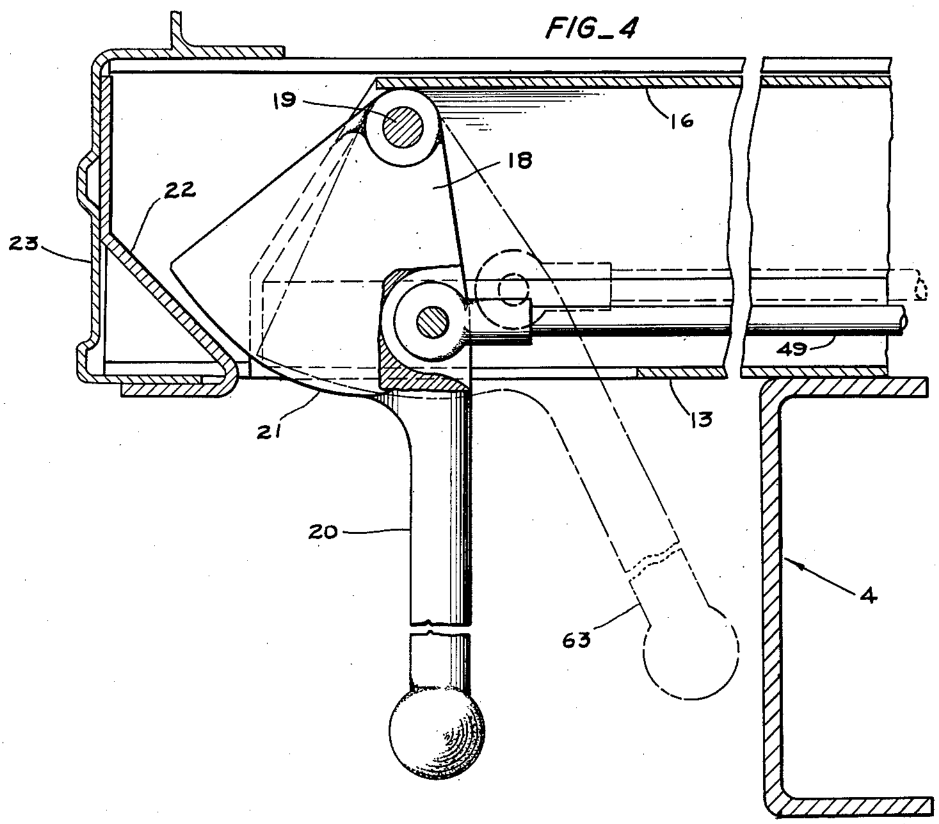
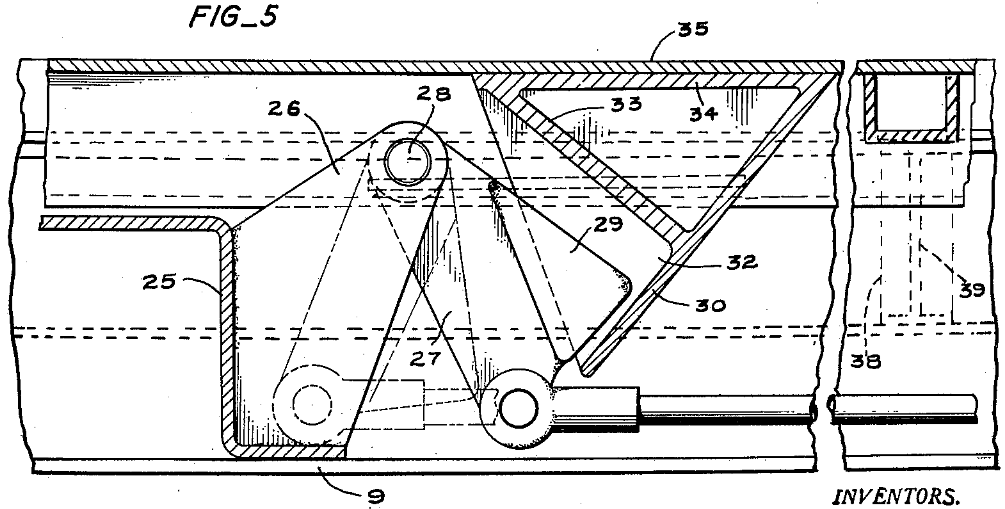
INVENTORS.
LESLIE A. HARLANDER
ROY K. WALTHER
BY
Boykin, Mohler & Wood
ATTORNEYS

United States Patent Office 3,034,825
Patented May 15, 1962

1

3,034,825

CONTAINER CHASSIS COMBINATION

Leslie A. Harlander, Orinda, and Roy K. Walther, Lafayette, Calif., assignors to Matson Navigation Company, San Francisco, Calif.

Filed July 20, 1959, Ser. No. 828,330
9 Claims. (Cl. 296—35)

This invention relates to a freight container that is adapted to be detachably supported on a vehicle chassis, and the like, for removal of the container including its load from such chassis to another carrier, or wherever desired.

One of the objects of the invention is the provision of such a container in combination with a chassis or vehicle, to which it is adapted to be attached and on which it is adapted to be supported, and improved means that is simple, safe, dependable, and automatically actuatable for quickly detachably securing the container to said chassis upon the container being lowered onto said chassis, and which means is easily and quickly manipulated for releasing the container for separation from the chassis.

Other objects and advantages will appear in the description and in the drawings.

In the drawings FIG. 1 is a side elevational view of a trailer and tractor combination in which the container or trailer body is supported on the trailer chassis.

FIG. 2 is a top plan view of the trailer chassis, broken in length, and with the trailer body removed.

FIG. 3 is a side elevational view, broken in length, showing the chassis of FIG. 2.

FIG. 4 is an enlarged, fragmentary, sectional view taken along line 4—4 of FIG. 2.

FIG. 5 is an enlarged, fragmentary, sectional view taken along line 5—5 of FIG. 2.

FIG. 6 is a horizontal sectional view through the front end of the floor of the container or body 1 transversely of the length of the container.

In detail, referring to FIG. 1, the trailer body, which will hereafter be called a "container" is generally designated 1. This container, as will later be described more in detail, is adapted to be detachably secured to a chassis frame generally designated 2 (FIGS. 1 to 3) and which may be a skeletal trailer as shown, and which trailer is adapted to be coupled, in the usual manner, with a tractor 3 (FIG. 1). Thus the container, when secured on the skeletal trailer, functions in the same manner as a conventional trailer used in the trucking industry.

The chassis frame comprises a pair of parallel, spaced, side frame members 4 in horizontally extending side by side relation (FIG. 2). These are mounted in the conventional manner on ground wheels 5 at the rear end of said members, and the usual retractable forward wheels 6 are adapted to be lowered to support the forward end of the chassis, and any load hereon such as the container 1, when the trailer is disconnected from the tractor. The conventional coupling means, generally designated 7, is at the forward end of the chassis frame for connecting the latter with a tractor.

A horizontal loading platform 8 is secured on the rear ends of the frame members. This platform is of a width that is substantially the width of the container body 1. The two frame members 4 are less widely spaced than the width of the containers and the forward end portions 9 (FIG. 3) of the frame members 4 are at a higher level than the portions thereof extending rearwardly therefrom. Inclined sections 11 connect the portions 9 of the side frame members with the portions extending rearwardly therefrom to the loading platform.

The words "forward," "forwardly," "rear" and "rearwardly" are used herein with respect to the ground wheels 5, which are at the rear end of the chassis while the

2 coupling 7 is at the forward end, the forward end being the leading end when the vehicle is being pulled by the tractor.

Adjacent to the rear wheels 5, but forwardly thereof, is a cross frame member 12 that is substantially the same length as the width of the loading platform 8, which is substantially equal to the width of the container. This cross member 12 projects equal distances from opposite sides of the pair of side frame members 4.

As seen in FIGS. 3, 4 the cross member 12 is hollow and is generally of box construction in cross sectional contour, having a relatively wide horizontal base 13 and parallel opposed side walls 14 extending upwardly from the longitudinally extending edges of said base or bottom wall (FIG. 3) for a distance and then extending convergently upwardly at 15 to join a relatively narrow top wall 16. The ends of the member 12 are closed by walls integral with member 12, and each formed with a slot through which the catch 18 of a latch element is adapted to swing (FIG. 4).

The catch of each latch element is generally of segmental or triangular shape with the apex uppermost and a shaft 19 carried in each end of member 12 rotatably supports each catch at its apex. The arcuately extending edge of each catch is generally directed downwardly and may be concentric with the axis of the shaft 19.

When each catch 18 is in locking position, a depending handle 20 thereon projects vertically downwardly therefrom along a line that almost extends vertically through the axis of each shaft 19, but that is slightly offset inwardly toward the longitudinal axis of the chassis, and the major portions of the catches 18 project oppositely outwardly from the pair thereof, so that the arcuate lower edges 21 of the catches 18 extend generally laterally and upwardly outwardly relative to the handles 20.

The oppositely outwardly projecting portions of the catches when in locking position as seen in FIG. 4 extend over a keeper 22 that is rigid with each of the longitudinally extending lower side frame members 23 of the container or body 1. This keeper extends slantingly upwardly and outwardly relative to the longitudinal axis of the body 1 so as to generally follow the contour of the arcuate edge 21 of the catch 18.

When the catches 18 are over the keepers 22 they hold the body 1 against separation from the chassis, and must be swung inwardly to clear the keepers before the body is released. This structure overcomes the difficulty encountered in the use of interengaging elements that demand quite accurate positioning relative to each other in order to perform their locking function, since all that is necessary for a locking operation is for the catch 18 to pass over the keeper 22.

A cross frame member 25 in the form of an inverted channel extends between and is rigidly welded to the forward portions 9 of frame members 4 adjacent to but spaced from the forward end of the chassis. This cross member 25 has a pair of spaced opposed ears 26 rigidly secured to its rear side and projecting rearwardly from the cross member.

The ears are spaced between the forward portions 9 of the side frame members 4 and a generally vertically extending forward latch catch 27 is pivotally secured between ears 26 at its upper end by a short shaft 28 (FIG. 5).

This forward catch has a rearward projection 29 thereon that is adapted to swing rearwardly about the shaft 28 to a position over a keeper 30 that is on a casting having side walls 32 (the near side wall being omitted in FIG. 5), a web 33 and a top wall 34. The top wall 34 is welded or otherwise suitably secured to the underside of floor 35 of the container at the portion of the latter that is between the forward portions 9 of the side frame members 4.

The forward portions 9 (FIG. 6) of the side frame members 4 extend upwardly between and substantially against guide pieces 38 hence there can be no lateral shifting of the forward end of the container relative to the chassis when the forward latch 27 is in a position with its projecting portion 29 swung over the keeper 30, and as long as said projecting portion 29 is over the keeper 30 the rear end of the container body cannot be separated from the chassis.

As seen in FIG. 6 I beams 39 extend oppositely outwardly from the guide pieces 38 to support a wooden floor 40 that is in continuation of floor 35 and that extends to the side walls of the container 1.

Centrally between the ends of cross member 12, and within the latter, is a crank element 45 (FIG. 2) centrally pivoted to the cross member 12 by a vertical pivot 46, that is centrally between a pair of oppositely outwardly extending arms 47, which arms extend generally longitudinally of the chassis when the rear latches 18 and the forward latch 27 are in latching relation to the container.

A crank arm 48 extends laterally at right angles to the arms 47 and is rigid with the latter.

Connecting links 49 are each pivotally connected at one of their ends to one of the outer ends of arms 47 and at their other ends to each of the latches 18 adjacent to the bottom of each of the latter.

A forwardly extending connecting link 51 is pivotally connected at one of its ends to the outer end of the crank arm 48 and link 51 is pivotally connected at its forward end by a horizontal pivot to the lower end of a transmission arm 52 (FIG. 3) that is pivoted at its upper end to a bracket secured to one of the cross frame members 53 of the chassis frame.

A second forwardly extending link 54 is pivotally connected at one end with the lower end of transmission arm 52, and the forward end of link 54 is pivotally connected with the lower end of a generally vertically extending rocker arm 55 (FIG. 3). This rocker arm is centrally pivoted by a horizontal pivot to a bracket carried by a cross frame member 56 that is approximately at the junctures between the forward portions 9 of the side frame members 4 and the portions of the latter that extend rearwardly thereof.

A third connecting rod 57 is pivotally connected at one end to the upper end of the rocker arm 55 and at its other end to the lower portion of the forward latch 27.

A cross frame member 59 spaced rearwardly of the cross frame member 56 (FIG. 3) extends between the side frame members of the chassis, and a helical spring 60 reacts between the cross frame member 59 and a flange 61 on the rod 54 adjacent to the arm 55 to yieldably hold latch 27 in locking relation to catch 30 and this action of spring 60 also yieldably holds the rear latches 18 in locking relation to the catches 22.

When the chassis is free from a container the latches 27, 18 are in the positions shown in FIGS. 4 and 5, and upon lowering a container onto the chassis, the catches 30, 22 will engage the inclined upper sides of the latches to automatically swing the latches to clear the catches and as soon as the container is supported on the side frame members 4 the latches will have cleared the catches and will automatically swing to the position over the catches as shown in FIGS. 4 and 5.

Since a handle 20 is always accessible at either side of the chassis adjacent to an operator at one or the other sides of a container, when the latter is on a chassis, it is only necessary for one operator at either such side to swing the handle 20 inwardly to the dot-dash line position 63 (FIG. 4) and all of the latches will be moved to clear the catches so that the container can be lifted from the chassis.

From the foregoing description it is seen that separate means is respectively carried on cross frame members 25 in the form of catch 29 that is midway between the forward end portions 9 of frame members 4, and on each of the projecting end portions of cross frame member 12 in the form of catches 18. The catch 29 and catches 18 are supported for simultaneous movement into and out of holding relation with body 1, the specific elements on said container that are engaged by said catches are keepers 30 and 22, each keeper extending below each catch, and each catch engaging its associated keeper for movement into tighter engagement upon any tendency of the body to move upwardly relative to the chassis.

What is claimed is:

1. In a vehicle having a chassis that includes a pair of spaced, opposed horizontally elongated frame members, a first cross member connected with and extending between said pair of frame members, a second cross frame member spaced from said first cross frame member having end portions projecting oppositely outwardly of said pair of frame members, separate means respectively carried on said first cross frame member spaced between said side frame members and on each of said end portions all supported for movement into and out of holding relation with a container adapted to be supported on said frame members thereby providing for securement of such containers on said frame member at three spaced points, two of which are spaced outwardly of said pair of frame members and one of which is spaced between said pair, means mounting said separate means on said first cross frame member and on said end portions for said movement, and means accessible to an operator at each side of said pair of frame members connected with said separate means for manually operating said separate means simultaneously from either side of said pair of frame members.

2. In a vehicle having a chassis that includes a pair of spaced, opposed, horizontally elongated frame members extending longitudinally of the longitudinal axis of said chassis adapted to support a body thereon for holding a load, said body having a forward end portion and a rear end portion, a body for such load removably supported on said frame members, a first cross frame member secured to said frame members below said rear portion of said body and a second cross frame member secured to said frame members below said forward portion of said body, a pair of latch elements respectively pivotally secured to the ends of said first cross frame member for swinging about horizontal axes toward and away from the longitudinal axis of said chassis, latch engaging means with said body engageable by said latch elements in holding relation thereto upon swinging said latch elements away from said axis, manually actuable means accessible at a side of said body connected with said latch elements for simultaneously swinging them toward said axis and out of engagement with said latch engaging means, and means yieldably connected with said latch elements for yieldably urging them for swinging away from said axis and into said holding relation with said latch engaging means, a single latch element on said second cross frame member disposed between said pair of elongated frame members, means pivotally securing said single latch element on said second frame member for swinging of said single latch element about a horizontal axis normal to said longitudinal axis and in a direction away from said forward end portion of said body, a latch engaging member rigid with said body below its said rear end portion engageable by said single latch in holding relation thereto upon so swinging said single latch element away from said forward end portion, means connecting said single latch element with said manually actuatable means for swinging said single latch element toward said forward end and out of engagement with said latch engaging member upon said manually actuatable means being moved to swing said pair of latch elements toward said axis.

3. In a vehicle having a chassis that includes a pair of spaced, opposed, horizontally elongated chassis frame members extending longitudinally of the longitudinal axis of said chassis adapted to support a body thereon; a body supported on said chassis frame members having opposite end portions respectively over the opposite ends of said chassis frame members; an elongated cross frame member secured to said pair of chassis frame members below said body with the terminating ends of said cross frame member facing oppositely outwardly of said pair of chassis frame members; a pair of catches each having an upper end portion and a lower end portion with the lower end portion of each catch having a downwardly directed keeper engaging surface; horizontal pivots respectively securing the upper end portions of said catches to the opposite end portions of said cross frame member for swinging said lower end portions about said pivots between body locking positions in which said lower end portions project outwardly of said terminating ends of said cross frame members to body releasing positions in which said lower portions are retracted to positions substantially within the outlines of said terminating ends as viewed from a side of said cross frame member; a pair of keepers rigid with said body supported by the latter in positions outwardly of and across said terminating ends of said cross frame member; said keepers having generally upwardly facing surfaces adapted to be engaged by said keeper engaging surfaces on said catches when said lower portions of the latter are swung to said body locking positions, manually actuatable means accessible at either end of said cross frame member for grasping by the hand of an operator and connected with each catch for swinging the latter by such hand from body locking position to body releasing position, and means connecting said catches for simultaneous movement to said body releasing positions when either of said catches is swung to body releasing position.

4. In a vehicle having a chassis that includes a pair of spaced, opposed, horizontally elongated chassis frame members extending longitudinally of the longitudinal axis of said chassis adapted to support a body thereon; a body supported on said chassis frame members having opposite end portions respectively over the opposite ends of said chassis frame members; an elongated cross frame member secured to said pair of chassis frame members below said body with the terminating ends of said cross frame member facing oppositely outwardly of said pair of chassis frame members; a pair of catches each having an upper end portion and a lower end portion with the lower end portion of each catch having a downwardly directed keeper engaging surface; horizontal pivots respectively securing the upper end portions of said catches to the opposite end portions of said cross frame member for swinging said lower end portions about said pivots between body locking positions in which said lower end portions project outwardly of said terminating ends of said cross frame members to body releasing positions in which said lower portions are retracted to positions substantially within the outlines of said terminating ends as viewed from a side of said cross frame member; a pair of keepers rigid with said body supported by the latter in positions outwardly of and across said terminating ends of said cross frame member; said keepers having generally upwardly facing surfaces adapted to be engaged by said keeper engaging surfaces on said catches when said lower portions of the latter are swung to said body locking positions, manually actuatable means accessible at either end of said cross frame member for grasping by the hand of an operator and connected with each catch for swinging the latter by such hand from body locking position to body releasing position, and means connecting said catches for simultaneous movement to said body releasing positions when either of said catches is swung to body releasing position, yieldable means operatively connected with said catches for yieldably moving them simultaneously from said body releasing positions to said body locking positions and for holding them in said body locking positions when released from manual actuation to said body releasing positions.

5. In a vehicle having a chassis that includes a pair of spaced, opposed, horizontally elongated chassis frame members extending longitudinally of the longitudinal axis of said chassis adapted to support a body thereon; a body supported on said chassis frame members having opposite end portions respectively over the opposite ends of said chassis frame members; an elongated cross frame member secured to said pair of chassis frame members below said body with the terminating ends of said cross frame member facing oppositely outwardly of said pair of chassis frame members; a pair of catches each having an upper end portion and a lower end portion with the lower end portion of each catch having a downwardly directed keeper engaging surface; horizontal pivots respectively securing the upper end portions of said catches to the opposite end portions of said cross frame member for swinging said lower end portions about said pivots between body locking positions in which said lower end portions project outwardly of said terminating ends of said cross frame members to body releasing positions in which said lower portions are retracted to positions substantially within the outlines of said terminating ends as viewed from a side of said cross frame member; a pair of keepers rigid with said body supported by the latter in positions outwardly of and across said terminating ends of said cross frame member; said keepers having generally upwardly facing surfaces adapted to be engaged by said keeper engaging surfaces on said catches when said lower portions of the latter are swung to said body locking positions, manually actuatable means accessible at either end of said cross frame member for grasping by the hand of an operator and connected with each catch for swinging the latter by such hand from body locking position to body releasing position, and means connecting said catches for simultaneous movement to said body releasing positions when either of said catches is swung to body releasing position, said manually actuatable means comprising a downward extension on and rigid with each catch.

6. In a vehicle having a chassis that includes a pair of spaced, opposed, horizontally elongated chassis frame members extending longitudinally of the longitudinal axis of said chassis adapted to support a body thereon; a body supported on said chassis frame members having opposite end portions respectively over the opposite ends of said chassis frame members; an elongated cross frame member secured to said pair of chassis frame members below said body with the terminating ends of said cross frame member oppositely outwardly of said pair of chassis frame members; a pair of catches each having an upper end portion and a lower end portion with the lower end portion of each catch having a downwardly directed keeper engaging surface; horizontal pivots respectively securing the upper end portions of said catches to the opposite end portions of said cross frame member for swinging said lower end portions about said pivots between body locking positions in which said lower end portions project outwardly of said terminating ends of said cross frame members to body releasing positions in which said lower portions are retracted to positions substantially within the outlines of said terminating ends as viewed from a side of said cross frame member; a pair of keepers rigid with said body supported by the latter in positions outwardly of and across said terminating ends of said cross frame member; said keepers having generally upwardly facing surfaces adapted to be engaged by said keeper engaging surfaces on said catches when said lower portions of the latter are swung to said body locking positions, manually actuatable means accessible at either end of said cross frame member for grasping by the hand of an operator and connected with each catch for swinging the latter by such hand from body locking position to body releasing position, and means connecting said catches for simultaneous movement to said body releasing positions when either of said catches is swung to body releasing position, said pivots being positioned above said keepers and said lower keeper engaging surface on each catch and the surface on each keeper adapted to be engaged by said keeper engaging surface being approximately tangential to an arc about each of said pivots, whereby upward movement of said body relative to said chassis when the said catches are in body locking position will tend to tighten said catches in said body locking positions.

7. In a vehicle having a chassis that includes a pair of spaced, opposed, horizontally elongated chassis frame members extending longitudinally of the longitudinal axis of said chassis adapted to support a body thereon; a body supported on said chassis frame members having opposite end portions respectively over the opposite ends of said chassis frame members; an elongated cross frame member secured to said pair of chassis frame members below said body with the terminating ends of said cross frame member facing oppositely outwardly of said pair of chassis frame members; a pair of catches each having an upper end portion and a lower end portion with the lower end portion of each catch having a downwardly directed keeper engaging surface; horizontal pivots respectively securing the upper end portions of said catches to the opposite end portions of said cross frame member for swinging said lower end portions about said pivots between body locking positions in which said lower end portions project outwardly of said terminating ends of said cross frame members to body releasing positions in which said lower portions are retracted to positions substantially within the outlines of said terminating ends as viewed from a side of said cross frame member; a pair of keepers rigid with said body supported by the latter in positions outwardly of and across said terminating ends of said cross frame member; said keepers having generally upwardly facing surfaces adapted to be engaged by said keeper engaging surfaces on said catches when said lower portions of the latter are swung to said body locking positions, manually actuatable means accessible at either end of said cross frame member for grasping by the hand of an operator and connected with each catch for swinging the latter by such hand from body locking position to body releasing position, and means connecting said catches for simultaneous movement to said body releasing positions when either of said catches is swung to body releasing position, said body including a pair of horizontally elongated spaced opposed body frame members rigid therewith between which said pair of chassis frame members are positioned when said body is supported on said chassis, said body frame members extending across the said terminating ends of said cross frame member and said keepers being rigid with said body frame members.

8. In a vehicle having a chassis that includes a pair of spaced, opposed, horizontally elongated chassis frame members extending longitudinally of the longitudinal axis of said chassis adapted to support a body thereon, a body supported on said chassis frame members having opposite end portions respectively over the opposite ends of said chassis frame members; a first cross frame member secured to said pair of chassis frame members below said body; a catch having an upper end portion and a lower end portion with the lower end portion having a downwardly directed keeper engaging surface; a horiontal pivot on said upper end portion of said catch, and means mounting said pivot on said cross frame member intermediate the ends of said first cross frame member for swinging said lower end portion transversely of the length of said first cross frame member from a body releasing position adjacent to said cross frame member away from said cross frame member to a body locking position projecting to one side of said first cross frame member and vice versa; a keeper rigid with said body having a catch engaging surface directed generally upwardly engageable with said keeper engaging surface when said catch is in said body locking position, manually actuatable means accessible at either of the two opposite sides of said body for grasping by the hand of an operator and connected with said catch for swinging the latter by such hand from said body locking position to said body releasing position, and yieldable means operatively connected with said catch for yieldably urging it to said body locking position and for yieldably holding it in said body locking position.

9. In a vehicle having a chassis that includes a pair of spaced, opposed, horizontally elongated chassis frame members extending longitudinally of the longitudinal axis of said chassis adapted to support a body thereon, a body supported on said chassis frame members having opposite end portions respectively over the opposite ends of said chassis frame members; a first cross member secured to said pair of chassis frame members below said body; a catch having an upper end portion and a lower end portion with the lower end portion having a downwardly directed keeper engaging surface; a horizontal pivot on said upper end portion of said catch, and means mounting said pivot on said cross frame member intermediate the ends of said first cross frame member for swinging said lower end portion transversely of the length of said first cross frame member from a body releasing position adjacent to said cross frame member away from said cross frame member to a body locking position projecting to one side of said first cross frame member and vice versa; a keeper rigid with said body having a catch engaging surface directed generally upwardly engageable with said keeper engaging surface when said catch is in said body locking position, manually actuatable means accessible at either of the two opposite sides of said body for grasping by the hand of an operator and connected with said catch for swinging the latter by such hand from said body locking position to said body releasing position, and yieldable means operatively connected with said catch for yieldably urging it to said body locking position and for yieldably holding it in said body locking position; a second cross frame member secured to said pair of chassis frame members under the opposite end of said body, said second cross frame member projecting at its ends substantially outwardly of said pair of chassis frame members, body locking means adjacent to the ends of said second cross frame member pivotally connected thereto for swinging from retracted body releasing positions within the outlines of the terminating ends of said second cross frame members about axes perpendicular to the axis on which said catch is swingable for movement to body locking positions projecting outwardly of said terminating ends of said second cross frame member, and catch engaging means rigid with said body extending across said terminating ends and across the longitudinal axis of said second cross frame member engageable with said catches when they are so swung to said body locking positions.

References Cited in the file of this patent

UNITED STATES PATENTS

| | | |
|---|---|---|
| 1,883,538 | Bywater | Oct. 18, 1932 |
| 2,053,969 | Olds | Sept. 8, 1936 |
| 2,123,424 | Kellett | July 12, 1938 |
| 2,126,950 | Ditchfield | Aug. 16, 1938 |
| 2,150,371 | Furnish | Mar. 14, 1939 |
| 2,351,314 | Ario | June 13, 1944 |
| 2,457,841 | Smith et al. | Jan. 4, 1949 |
| 2,613,836 | Newhall et al. | Oct. 14, 1952 |
| 2,699,735 | Williams | Jan. 18, 1955 |
| 2,808,289 | Scoby | Oct. 1, 1957 |
| 2,812,974 | McHugh | Nov. 12, 1957 |
| 2,846,264 | Loomis | Aug. 5, 1958 |
| 2,942,912 | Lucas et al. | June 28, 1960 |